April 26, 1927.  
H. H. MACOMBER  
WINDMILL  
Filed Dec. 29, 1922  
1,626,203  
2 Sheets-Sheet 1
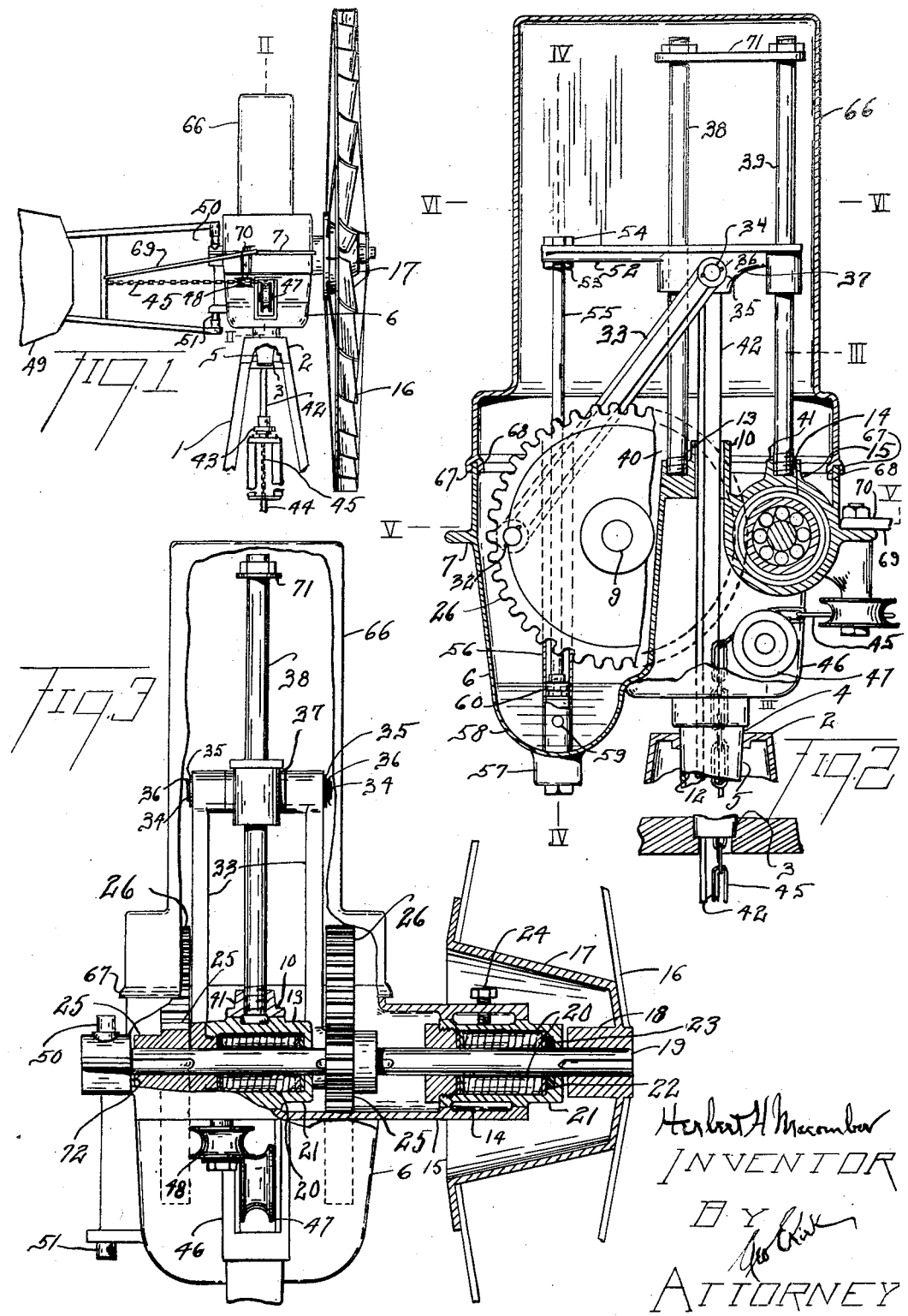

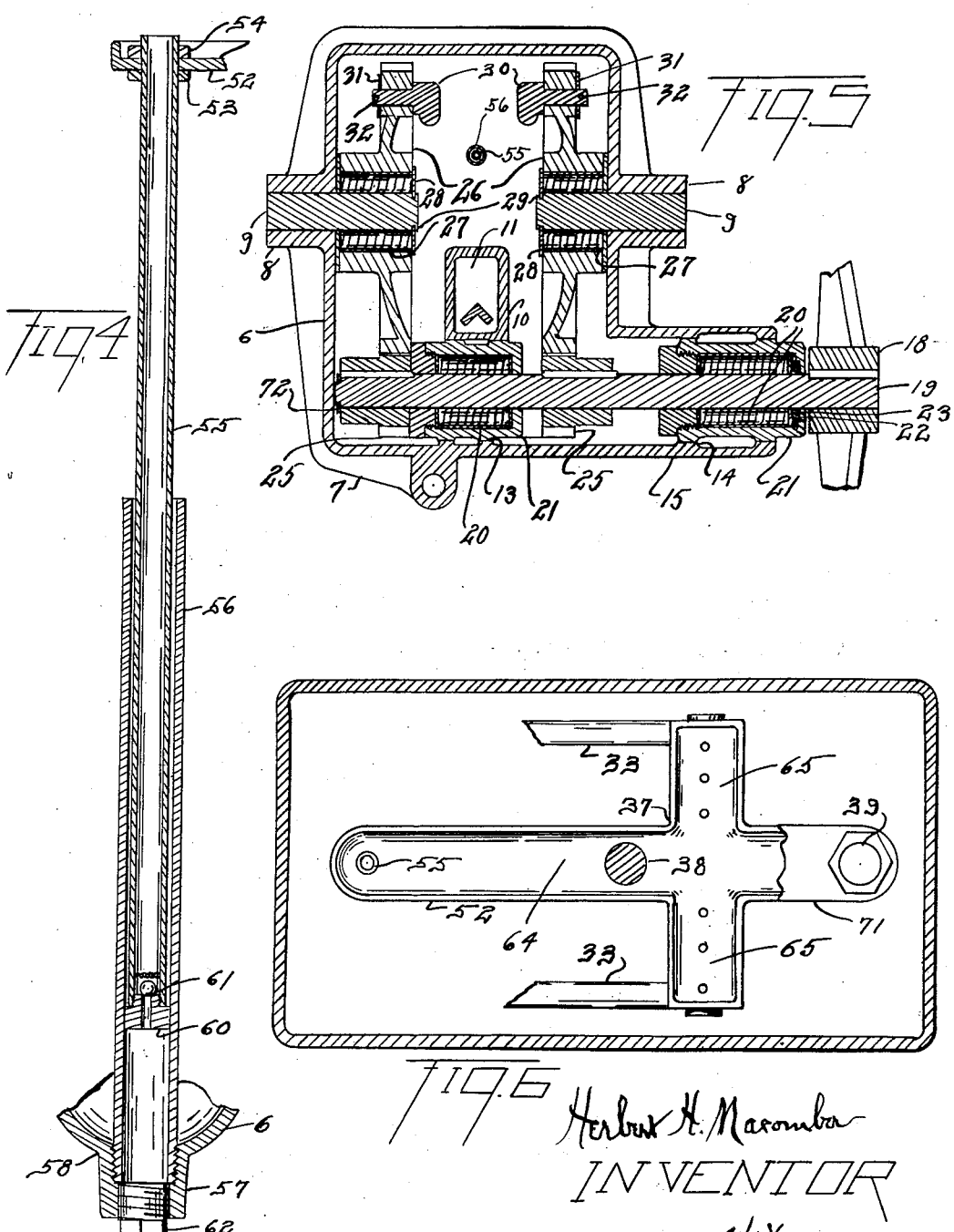

Patented Apr. 26, 1927.

1,626,203

UNITED STATES PATENT OFFICE.

HERBERT H. MACOMBER, OF KENDALLVILLE, INDIANA, ASSIGNOR TO FLINT & WALLING MFG. CO., OF KENDALLVILLE, INDIANA, A CORPORATION OF INDIANA.

WINDMILL.

Application filed December 29, 1922. Serial No. 609,554.

This invention relates to features of wind mill construction.

This invention has utility when incorporated in back geared mills of the self contained or housed type.

Referring to the drawings:

Fig. 1 is a fragmentary view of an embodiment of the invention in a wind mill;

Fig. 2 is a section on the line II—II, Fig. 1;

Fig. 3 is a view on the line III—III, Fig. 2;

Fig. 4 is a section on the line IV—IV, Fig. 2;

Fig. 5 is a section on the line V—V, Fig. 2; and

Fig. 6 is a section on the line VI—VI, Fig. 2.

A wind mill tower 1 is provided having a cap 2. This cap 2 has a pivot bearing 3 and thereabove and concentric therewith, a lateral bearing 4 with which tubular stem 5 coacts as a support for main or lower housing 6 of the wind mill structure proper. The upper portion of this housing 6 has a peripheral flange 7 which has bosses 8 in alignment for carrying stub shaft 9. Centrally of this housing 6 there rises a portion 10 having a top opening 11 therein in alignment with tubular portion 12 of the stem 5. This hollow central portion 10 extends over to a wall of the housing 6 away from the stub shafts 9 and said portion has a cylindrical seat portion 13 in alignment with a second cylindrical seat portion 14 in an extension 15 of the housing 6, and the opening 11.

Wind wheel 16 is shown as having overhanging hub 17 provided with boss 18 fixed with main wind wheel shaft 19. This shaft 19 is mounted in a pair of cylindrical roller bearings 20. This pair of roller bearings 20 is mounted in sleeves 21 in respective aligned seats 13, 14, of the housing portion 10, 15, integral with the main housing 6. The outer sleeve 21 has about the shaft 19, a groove 22, for receiving packing 23 thereby serving to prevent lubricant from the housing 6 escaping or working out upon the wind wheel 16. This outer cylindrical sleeve 21 is fixed in position with the extension 15 from the housing 6 by a set screw 24.

Keyed to the drive shaft 19, and on each side of the inner-bearing 20, is a pinion 25. Each of these pinions 25 is in mesh with a gear wheel 26. Each gear wheel 26 is mounted upon a cylindrical roller bearing 27 carried by the aligned stub shafts 9 in the housing 6. Each of these gear wheels 26 is held in position on its stub shaft 9 by washer 28. Extending to engage the antifriction bearing 27. These washers 28 are held by upset end portions 29 of the shafts 9.

Each gear wheel 26 carries a wrist pin 30 upon which is disposed a washer 31 as held in position by key 32. Each of these wrist pins 30 has integral therewith a pitman or connecting rod 33 upwardly extending to engage a pin 34 with which it is held assembled by washer 35 and a key 36, outward therefrom. The pitmans 33 are thus assembled with crosshead 37. This crosshead 37, as operated by the pair of pitmans 33, 37, slides upward and downward upon guide rods 38, 39. The guide rod 38 is anchored in a boss 40 on top of the central portion 10 of the housing 6 while on the opposite side of the opening 11 from this opening 40 is boss 41 for mounting the guide rod 39.

Fast to this crosshead 37 and downwardly therefrom through the opening 11 and tubular stem 5, is angle reciprocable rod 42 extending below the cap 2 to a swivel bearing 43 thereby connected to pump rod 44. Through the tubular swivel bearing 42 is chain or flexible pull-out line 45 extending upward between the flanges of the angle rod and through the tubular portion 12 of the stem 5 to pass out between the depending cheeks or flanges 46 from the housing 6; thence over guide roller 47, and about guide roller 48 to rudder 49 mounted to swing upon trunnions 50, 51, integral with the main housing 6. Pulling of the chain 45 swings the rudder 49 toward the wind wheel 16 to throw the wind wheel 16 out of gear.

The cross head 37 has a horizontal extension 52. Nuts 53, 54, serve to anchor tubular plunger or piston rod 55 to the cross head extension 52. This piston rod 55 extends downwardly into barrel 56 having threaded engagement with extension 57 of well portion 58 of this main housing 6. Restricted opening 59 through this pump barrel 56 provides communication between the well and this pump barrel interior. Piston 60 carried by the piston rod 55 is provided with check valve 61 so that in the downward reciprocation of this piston rod 55 lubricant from the well 58 may lift the check valve 61 and as forced into the hollow piston 55 to flow out the top thereof. The lower end of the plunger housing or pump barrel 56 may be closed by housing plug 62, engaging with the housing 6.

A lubricant as forced upward in and through this tubular piston rod 55 floods into ways 64 in the cross head 52 over to lubricate the two guide rods 38, 39. Transverse way 65 from this way 64, allows the lubricant further to slop over, not only to lubricate the pitman 33 and the pin 34, but to spatter out upon the gears 26, and by them may be taken over to the pinions 25 and thus effectively lubricate the entire transmission system of this wind mill.

Mounted on this main one piece housing 6 is a cap or extension section 66, completing the enclosing of the transmission mechanism by having outward flange 67, and inner flange 68 for engagement with this lower section 6 by snugly fitting thereover.

The throwing-in of the rudder 49 is limited by rod 69, coacting with the stem 70 fast with the housing 6.

The pair of parallel guide rods 38, 39, have their upper portions spaced and stiffened by cross bar 71.

Upset end 72 of the main wind shaft 19 takes the thrust of the shaft against the housing 6 as well as retains the inner terminal pinion 25 in position against slipping off said shaft.

In the wind motor structure as herein disclosed there is shown a main frame 6 which permits simplified construction for mounting positively the parallel shafts of the transmission mechanism. This structure is economically produced by machine work for the seats of the shaft and stub shafts may be dressed and simultaneously aligned in a single jig operation. When the entire transmission mechanism is housed, the closure cap effectively shields the mechanisms from the weather. The mill is self lubricating. It may have long periods of operation without any attention whatsoever. As protected from the weather it is of long life, economical for upkeep and of low friction loss in operation.

What is claimed and it is desired to secure by Letters Patent is:

1. A wind motor open top main housing section unit, a closure cap for the unit, transmission mechanism mounted in the unit including a crosshead movable in the cap, and having bearings, a lubricant way above said bearings, and lubricant distributing ducts from the way to said bearings, and crosshead actuated pump means for supplying lubricant to the crosshead lubricant way.

2. A wind motor embodying a housing having a chamber, a crosshead, a tubular rod rigidly connected to the crosshead, and a guide in the chamber into which the rod extends.

3. A wind motor embodying a housing having a chamber, a crosshead, a tubular rod rigidly connected to the crosshead, and a guide in the chamber into which the rod extends, said crosshead being provided with ways in communication with said rod.

4. A wind motor embodying a housing providing a chamber as a lubricant reservoir, said housing having integrally therewith a downwardly extending tubular stem externally tapered to provide a seat, gearing for the motor in said housing, shafts for the gearing having bearings in said housing, and a support providing a tapered socket for the stem seat.

5. A wind motor embodying a housing providing a chamber as a lubricant reservoir, said housing having integral therewith a downwardly extending tubular stem, a support for the stem, said housing having exterior of the chamber a laterally extending opening to said stem, and pull-out means extending through said opening into said stem and thence through said support.

6. A wind motor tubular mounting stem providing a housing section having a chamber, said housing having a pair of cheeks integral therewith and extending laterally from the stem exterior of said chamber to provide therebetween an opening to said stem, wind motor pull-out means extending from the stem through said opening, said housing having a horizontal bearing in said chamber, a wind wheel shaft in said bearing, and a guide roller for the pull-out means carried below said bearing by said cheeks in said opening and having its axis parallel to said shaft.

7. A wind motor open top main housing section unit, a closure cap for the unit, and transmission mechanism mounted in the unit including a crosshead movable in the cap and having bearings, a lubricant way above said bearings, and lubricant distributing ducts from the way to said bearings.

8. A wind motor open top main housing section unit, a closure cap for the unit, transmission mechanism mounted in the unit including a crosshead movable in the cap and having bearings, a lubricant way above said bearings, and lubricant distributing ducts from the way to said bearings, and means for supplying lubricant to the crosshead lubricant way.

9. A wind motor open top main housing section unit, a closure cap for the unit, transmission mechanism mounted in the unit including a crosshead movable in the cap and having bearings, a lubricant way carried by the crosshead above said bearings, lubricant distributing ducts from the way to said bearings, and pump means actuated by said transmission for supplying lubricant to the crosshead lubricant way.

In witness whereof I affix my signature.

HERBERT H. MACOMBER.